United States Patent
Bareiss

(10) Patent No.: US 7,896,448 B2
(45) Date of Patent: Mar. 1, 2011

(54) METHOD FOR PRECHARGING A LOW-PRESSURE ACCUMULATOR OF A MOTOR VEHICLE BRAKING SYSTEM

(75) Inventor: Alexander Bareiss, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 825 days.

(21) Appl. No.: 11/662,222

(22) PCT Filed: Jul. 14, 2005

(86) PCT No.: PCT/EP2005/053374

§ 371 (c)(1),
(2), (4) Date: Sep. 26, 2007

(87) PCT Pub. No.: WO2006/027286

PCT Pub. Date: Mar. 16, 2006

(65) Prior Publication Data

US 2008/0190720 A1    Aug. 14, 2008

(30) Foreign Application Priority Data

Sep. 9, 2004    (DE) ........................ 10 2004 044 337
Oct. 16, 2004    (DE) ........................ 10 2004 050 755

(51) Int. Cl.
*B60T 8/48* (2006.01)
(52) U.S. Cl. ..................... 303/191; 303/1; 303/DIG. 11
(58) Field of Classification Search .................... 303/1, 303/113.1, 113.2, 119.1, 119.2, DIG. 11, 303/20, 191, 155
See application file for complete search history.

(56) References Cited

U.S. PATENT DOCUMENTS

| | | | | |
|---|---|---|---|---|
| 5,927,828 A | * | 7/1999 | Beck | 303/DIG. 11 |
| 5,957,551 A | * | 9/1999 | Maron et al. | 303/191 |
| 6,419,329 B1 | * | 7/2002 | Buschmann et al. | 303/113.1 |
| 6,652,039 B1 | * | 11/2003 | Shull et al. | 303/113.2 |
| 6,752,473 B2 | * | 6/2004 | Yang | 303/113.2 |

FOREIGN PATENT DOCUMENTS

| | | |
|---|---|---|
| DE | 40 33 024 | 4/1992 |
| DE | 197 16 404 | 10/1998 |
| DE | 198 41 152 | 10/1999 |
| DE | 100 59 348 | 6/2001 |
| JP | 10-230832 | 9/1998 |
| JP | 11-501884 | 2/1999 |

* cited by examiner

*Primary Examiner*—Thomas J Williams
(74) *Attorney, Agent, or Firm*—Kenyon & Kenyon LLP

(57) ABSTRACT

A method for pre-filling a low-pressure storage device of a motor vehicle braking system, having a changeover valve, a hydraulic pump, an outlet valve, and a low-pressure storage device situated in a suction line of the hydraulic pump. The low-pressure storage device can be pre-filled in a particularly simple and low-noise manner if the actuation of the foot brake pedal is monitored using a sensor mechanism and, when there is an actuation, the changeover valve is closed in order to lock in the braking pressure acting on the wheel brake, and at least one of the outlet valves is opened in order to release the braking pressure into the low-pressure storage device.

12 Claims, 2 Drawing Sheets

METHOD FOR PRECHARGING A LOW-PRESSURE ACCUMULATOR OF A MOTOR VEHICLE BRAKING SYSTEM

FIELD OF THE INVENTION

The present invention relates to a method for pre-filling a low-pressure storage device of a motor vehicle brake system, as well as to a motor vehicle brake system.

BACKGROUND INFORMATION

Modern motor vehicle brake systems, designed in order to execute an electronic stability program (ESP) or traction controlling, standardly include a hydraulic pump that is controlled by a control device. In a critical driving situation, the hydraulic pump is automatically controlled, and increases the braking pressure acting on the wheel brake, suctioning brake fluid from the brake fluid reservoir or from a low-pressure storage device. The braking pressure at the wheel is, as a rule, modulated by actuating an intake valve and an outlet valve, while the hydraulic pump runs with a predetermined nominal power and, in combination with a changeover valve, sets the system to a system pressure.

FIG. 1 shows, as an example, a hydraulic brake system 17 known from the prior art that is designed for the execution of an electronic stability program. Brake system 17 includes two brake circuits 19a, 19b in an X-arrangement that are fashioned symmetrically. In the following, reference is therefore made only to part 19a, shown at the left in the Figure.

Brake system 17 includes a foot brake pedal 1, a brake servo (power brake unit) 2 with a brake master cylinder 4 connected thereto, on which a brake fluid reservoir 3 is situated. When foot brake pedal 1 is actuated, a corresponding pressure is produced in main brake lines 5a, 5b, which acts on wheel brakes 11 of the right front wheel (RF) and of the left rear wheel (LR) via a changeover valve 8a and the two intake valves 10a, 10b. The path in which pressure builds up when foot brake pedal 1 is actuated is identified by arrows b. In this basic state (state without flow), changeover valve 8a is open and a high-pressure switching valve 7a situated parallel thereto is closed. Changeover valve 8a is used to switch back and forth between foot pedal operation and an automatic control operation in which there is active pressure buildup by the system itself.

When there is an intervention of the electronic stability program, hydraulic pump 9a, or its motor 16, is controlled by a control device 18, and automatically builds up braking pressure that acts on wheel brakes 11. In this control state, changeover valve 8a is controlled and high-pressure switching valve 7a, which is situated between brake master cylinder 4 and hydraulic pump 9a, is opened. Hydraulic pump 9a then conveys the hydraulic fluid along paths a to wheel brakes 11. The hydraulic fluid thus flows from brake fluid reservoir 3 through main brake line 5a, high-pressure switching valve 7a, a suction line 6a, through hydraulic pump 9a, and further through intake valves 10a, 10b, into wheel brakes 11. In order to modulate the braking pressure, intake valves 10a, 10b (function: "hold pressure") and outlet valves 13a, 13b (function: "decrease pressure") are correspondingly opened or closed. In the "decrease pressure" state, the hydraulic fluid flows through outlet valves 13a, 13b into a low-pressure storage device 14a, from which hydraulic pump 9a suctions the hydraulic fluid and pumps it back into the system pressure circuit, or to wheel brakes 11.

A rapid reaction of the electronic stability program system is possible in particular if, at the beginning of a controlling action, low-pressure storage device 14 contains a sufficient quantity of hydraulic fluid that can be suctioned by hydraulic pump 9a. In order to ensure, before a controlling action, a sufficient filling state of low-pressure storage device 16a, it is known to partially fill low-pressure storage device 16a (pre-filling). For this purpose, hydraulic pump 9a is controlled and valves 7a and 13a are opened, and in this way hydraulic fluid is pumped into low-pressure storage device 14a. In this process, the operation of hydraulic pump 9a and the actuation of valves 7a and 13a produces a relatively loud noise that has a disturbing effect and that can irritate the driver.

It is therefore an object of the present invention to provide a method for pre-filling the low-pressure storage device, or to provide a correspondingly designed brake system in which the hydraulic pump need not be actuated in order to pre-fill the storage device, so that no disturbing noises arise.

SUMMARY OF THE INVENTION

An important idea of the present invention is to use the pressure produced by the driver when the brake pedal is actuated to pre-fill the low-pressure storage device. According to the present invention, for this purpose an actuation of the foot brake pedal is monitored using sensors, and, when an actuation is recognized, first the valve connected before the wheel brake (preferably the changeover valve) is closed in order to lock in the braking pressure acting on the wheel brake, and then at least one outlet valve is opened in order to release, through the changeover valve, pressure that is still locked in into the low-pressure storage device. This pre-filling method has the advantage that the hydraulic pump does not have to be actuated; rather, the low-pressure storage device is filled solely through the actuation of the brakes. As a result, there is in particular no disturbing startup noise of the hydraulic pump.

The outlet valve is preferably opened only after the closing of the changeover valve, so that the brake pedal does not sag too far downward during its actuation.

The pre-filling method according to the present invention is preferably carried out while the vehicle is at a standstill, before driving begins (i.e., before the actual first movement of the vehicle), and is preferably started before the ignition is switched on. The sensor mechanism for recognizing an actuation of the foot brake pedal is in this case to be designed in such a way that it can be active already before the ignition is switched on.

In order to cause the driver to actuate the brakes already before starting the engine, or at least before the vehicle begins to move, the vehicle is preferably designed in such a way that in general it is possible to start the engine only if the driver actuates the foot brake pedal during the starting (similar to vehicles with automatic transmission, in which the foot brake has to be actuated in order to move the transmission lever to the drive position).

In order to recognize a brake pedal actuation, for example the pre-pressure sensor (which is standardly already present anyway) can for example be evaluated, or a pedal sensor, such as e.g. a path or force sensor, can be provided on the brake pedal.

According to a preferred specific embodiment of the present invention, the pre-filling method takes place as follows: In a first step, an actuation of the foot brake pedal by the driver is recognized by a sensor mechanism, and the changeover valve is closed after a predetermined braking pressure has been achieved. After the driver has taken his foot off the brake pedal and the braking pressure (pre-pressure) again falls below a predetermined value, at least one of the outlet valves is opened in order to release the braking pressure into the low-pressure storage device. The outlet valve is therefore preferably opened only after the pressure is relieved on the brake pedal, in order to prevent the vehicle from rolling in an undesired fashion when it is parked on an incline.

After the pre-filling of the low-pressure storage device, the actuated valves are preferably returned to their initial position.

The low-pressure storage device is preferably filled only up to a predetermined filling state, in order not to remove too much brake fluid from the rest of the brake system. For this purpose, the low-pressure storage device preferably has a filling state sensor that supplies corresponding filling state information to the control device. When a predetermined filling state has been achieved, the line to the low-pressure storage device is preferably interrupted, and the rest of the pressure is conducted in the direction of the brake master cylinder via the changeover valve.

After a control intervention, e.g. of the electronic stability program, in which the hydraulic pump has suctioned fluid from the storage device, the filling state of the low-pressure storage device is preferably again brought to a predetermined level. This can be controlled in a known manner by the hydraulic pump, or, as described above, can take place through an actuation of the foot brake pedal. In this way, it is ensured that identical starting conditions are present for a subsequent control intervention, so that a rapid reaction of the control system can take place.

A motor vehicle braking system that is correspondingly set up in order to execute the pre-filling method includes, besides controllable valves and a hydraulic pump, a control device with which the hydraulic pump and the controllable valves are controlled. According to the present invention, the control device is programmed in such a way that the pre-filling method described above can be carried out.

DETAILED DESCRIPTION

Figure 1:
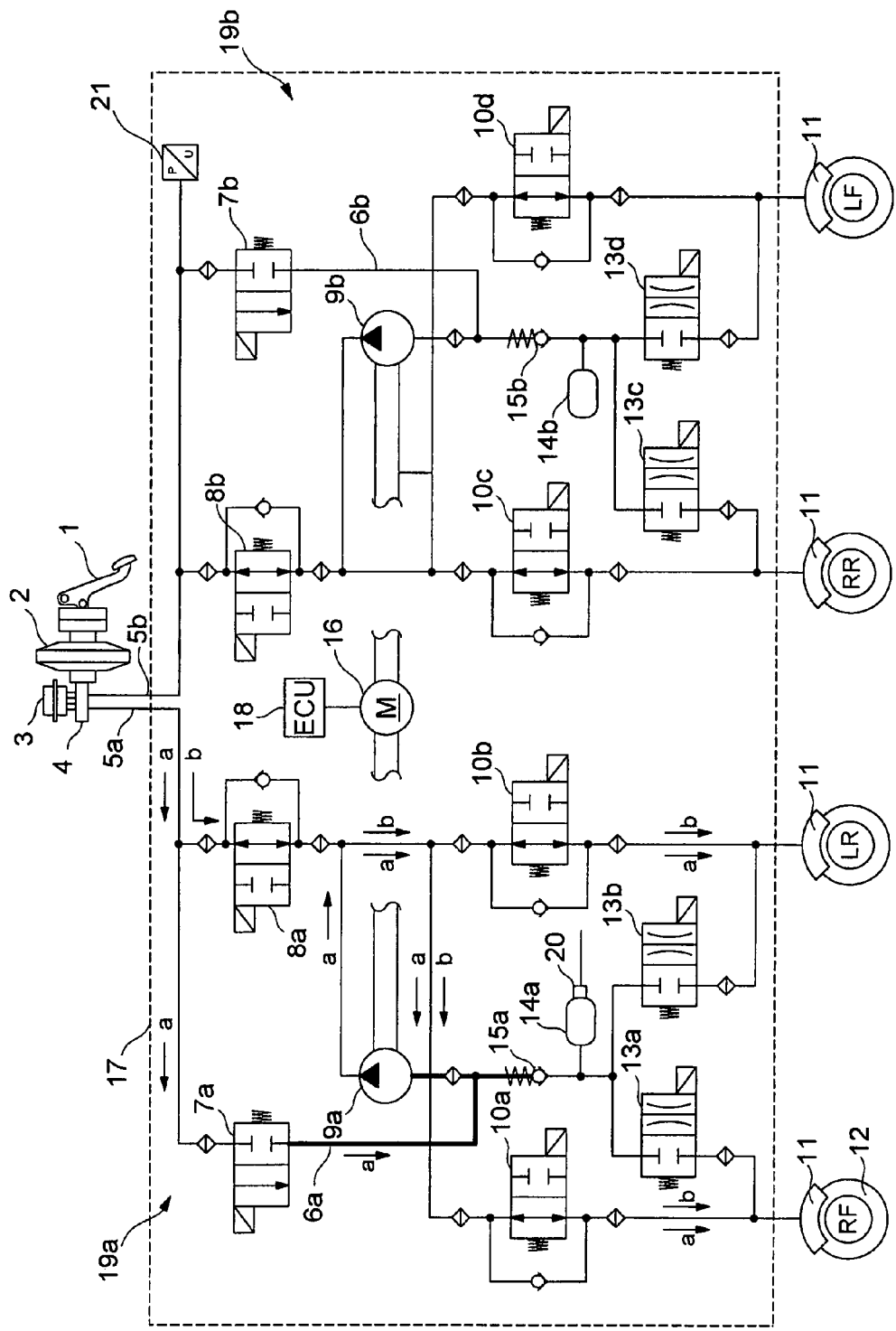
FIG. 1 shows a motor vehicle braking system known from the prior art that is set up to carry out a pre-filling of a pressure storage device.

FIG. 1 shows a known motor vehicle braking system 17 in an X-arrangement. With regard to the explanation of the individual elements and their manner of functioning, reference is made to the introduction to the description above.

In contrast to motor vehicle brake systems that have the same construction and are known from the prior art, this brake system 17 is designed for the execution of a pre-filling procedure in which a brake pedal actuation is used to pre-fill low-pressure storage device 14a or 14b. In this way it is achieved that, in the case of a safety-critical driving situation in which, for example, the electronic stability program intervenes in the operation of the vehicle, a sufficient quantity of brake fluid is stored that can be rapidly suctioned by hydraulic pump 9a or 9b. Here, the pre-filling method is controlled by a control device 18 that is connected to valves 7, 8, 10, 13, to a filling state sensor 20, and to a pre-pressure sensor 21.

Figure 2:
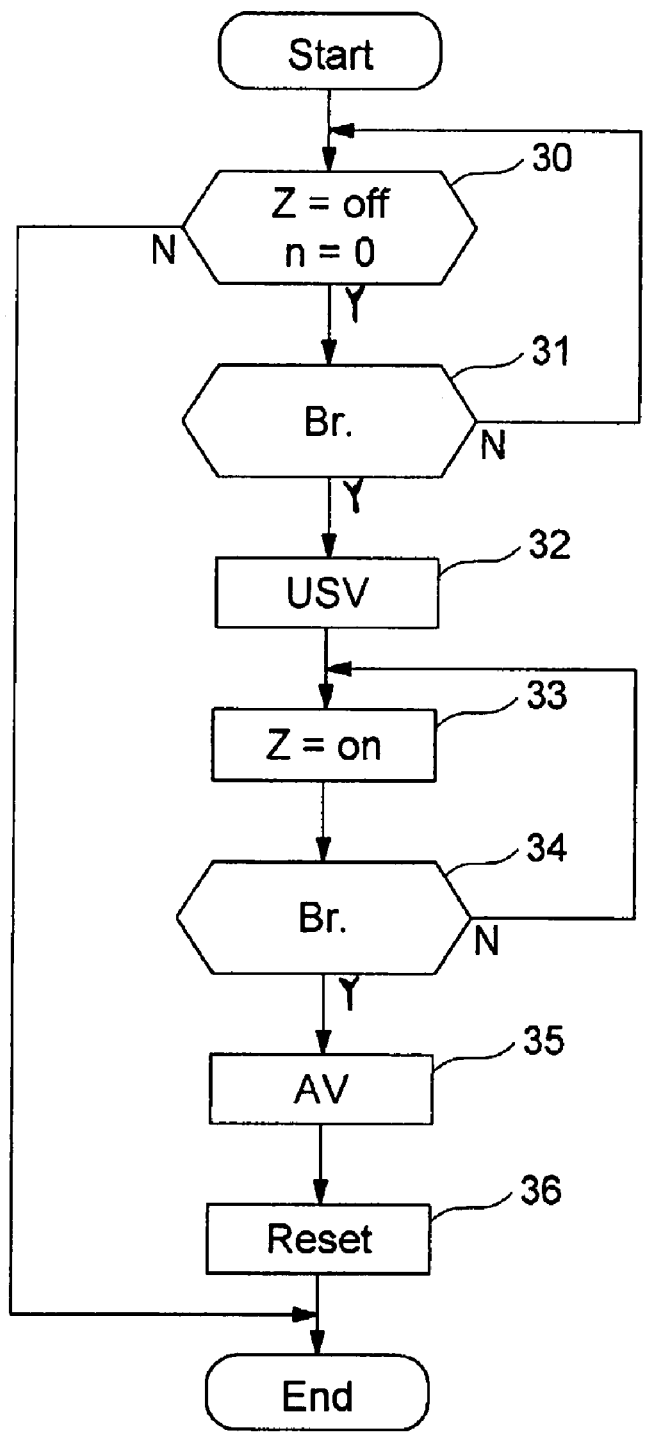
FIG. 2 shows the important method steps of a method for pre-filling a low-pressure storage device, in the form of a flow diagram.

FIG. 2 shows a flow diagram with the important method steps for the pre-filling of low-pressure storage device 14a, 14b. In step 30, it is first determined whether the ignition has been switched off and the vehicle is at a standstill. If the answer is no (N), the method terminates. If yes (Y), then in step 31 it is checked, on the basis of pre-pressure sensor 21 (or some other sensor mechanism), whether the driver is actuating foot brake pedal 1 and the braking pressure exceeds a predetermined threshold value. In this case (Y), changeover valves 8a, 8b are closed, thus locking in the braking pressure at wheel brakes 11 (step 32).

In order to cause the driver to actuate the brakes during the starting of the vehicle, the vehicle is preferably designed in such a way that the engine can be started only if the driver is actuating the brake. In step 33, the engine can now be started.

In step 34, it is checked whether the driver has released the brake pedal after the starting. This can likewise be monitored by a pre-pressure sensor 21. If the braking pressure (pre-pressure) falls below a predetermined threshold value (case Y), then in step 35 at least one of the outlet valves 13a, 13b or 13c, 13d is opened, and the locked-in pressure is released into low-pressure storage device 14a, 14b. Otherwise (N), the pre-pressure is further monitored.

During the pre-filling, the filling state of low-pressure storage device 14a, 14b is monitored by filling state sensors 20. If the filling state exceeds a predetermined level, the remaining braking pressure is released back in the direction of brake master cylinder 4. For this purpose, changeover valves 8 are opened again, and outlet valves 13 are closed.

After the pre-filling of low-pressure storage device 14a, 14b, in step 36 valves 8, 13 are returned to their initial position (opened without flow or closed without flow).

LIST OF REFERENCE CHARACTERS 1 foot brake pedal
2 brake servo
3 brake fluid reservoir
4 brake master cylinder
5a,5b main brake lines
6a,6b suction lines
7a,7b high-pressure switching valves
8a,8b changeover valves
9a,9b hydraulic pumps
10a-10d intake valves
11 wheel brakes
12 brake disks
13a-13d outlet valves
14a,14b low-pressure storage device
15a,15b return (check) valves
16 pump motor
17 ESP hydraulic system
18 control device
19a,19b brake circuits
20 filling state sensor
21 pre-pressure sensor
30-36 method steps

What is claimed is:

1. A method for pre-filling a low-pressure storage device of a motor vehicle brake system including a valve situated between a brake master cylinder and a wheel brake, an outlet valve situated after the wheel brake, and the low-pressure storage device situated in a suction line of a hydraulic pump, the method comprising:

prior to ignition of the motor vehicle, building up a braking pressure through an actuation of a foot brake pedal;

closing the valve in order to lock-in a braking pressure acting on the wheel brake; and opening the outlet valve in order to release a braking pressure into the low-pressure storage device.

2. The method according to claim 1, wherein the pre-filling method is carried out early enough that the pre-filling of the low-pressure storage device before or at a beginning of travel is ensured.

3. The method according to claim 1, wherein the actuation of the foot brake pedal and the closing of the valve take place before an ignition of the motor vehicle is switched on.

4. The method according to claim 1, wherein the outlet valve is opened when the brake pedal is no longer actuated and a pre-pressure falls below a threshold value.

5. The method according to claim 1, further comprising filling the low-pressure storage device only to a predetermined filling state.

6. The method according to claim 1, further comprising bringing a filling state of the low-pressure storage device to a predetermined level after a control intervention in which the hydraulic pump was actuated.

7. A braking system for a motor vehicle, comprising:
- a valve situated between a brake master cylinder and a wheel brake;
- an outlet valve situated after the wheel brake;
- a hydraulic pump;
- a low-pressure storage device situated in a suction line of the hydraulic pump; and
- a control device for controlling the hydraulic pump and the valves, wherein the control device controls a pre-filling of the low-pressure storage device in which an actuation of a foot brake pedal is recognized by a sensor mechanism prior to ignition of the motor vehicle, and, in the case of an actuation, the valve is closed in order to lock-in a braking pressure acting on the wheel brake, and the outlet valve is opened in order to release a braking pressure into the low-pressure storage device.

8. The braking system according to claim 7, wherein an actuation of the foot brake pedal is recognized before an ignition of the motor vehicle is switched on.

9. The braking system according to claim 8, wherein the control device closes the valve already before the ignition is switched on, if a brake pre-pressure exceeds a threshold value.

10. The braking system according to claim 7, wherein the low-pressure storage device has a filling state sensor with which a filling state of the low-pressure storage device is measured.

11. A method for pre-filling a low-pressure storage device of a motor vehicle brake system including an inlet valve situated between a brake master cylinder and a wheel brake, an outlet valve situated after the wheel brake, and the low-pressure storage device situated in a suction line of a hydraulic pump, the method comprising:
- closing the inlet valve in order to lock in the brake pressure, if all of the following conditions are satisfied: an ignition of the motor being switched off, the motor vehicle being at a standstill, a manual brake pedal being actuated, and a brake pressure exceeding a predetermined threshold value;
- opening the outlet valve to release the brake pressure into the low-pressure storage device, in response to the ignition of the motor being switched on and the manual brake pedal no longer being actuated; and
- responsive to a filling state of the low-pressure storage device exceeding a predetermined level, closing the outlet valve and opening the inlet valve.

12. The method of claim 11, wherein the manual brake pedal being actuated is a prerequisite to the ignition of the motor vehicle being switched on.

* * * * *